US009829972B2

(12) United States Patent
Conzola et al.

(10) Patent No.: US 9,829,972 B2
(45) Date of Patent: Nov. 28, 2017

(54) EYE TRACKING FOR AUTOMATICALLY UPDATING DOCUMENT STATUS

(71) Applicant: Lenovo (Singapore) Pte. Ltd., Singapore (SG)

(72) Inventors: Vincent Charles Conzola, Raleigh, NC (US); Daniel Jordan Schantz, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/205,648

(22) Filed: Mar. 12, 2014

(65) Prior Publication Data

US 2015/0261292 A1      Sep. 17, 2015

(51) Int. Cl.
*G06F 3/01*     (2006.01)
*G06K 9/00*     (2006.01)

(52) U.S. Cl.
CPC ......... *G06F 3/013* (2013.01); *G06K 9/00604* (2013.01)

(58) Field of Classification Search
CPC ........ G06F 3/013; G06F 3/017; G06F 3/0481; G06F 2203/04806; G06F 3/048; A61B 3/113; G06K 9/00597; G06K 9/00604; G02B 27/0093

USPC ................. 345/156, 661; 351/209; 382/103; 396/51

See application file for complete search history.

(56) References Cited

U.S. PATENT DOCUMENTS

| | | | |
|---|---|---|---|
| 2003/0210226 A1* | 11/2003 | Ho .......................... | G06F 3/0483 345/156 |
| 2006/0256083 A1* | 11/2006 | Rosenberg ..................... | 345/156 |
| 2011/0022950 A1* | 1/2011 | Dallago .................. | G06F 3/013 715/256 |
| 2013/0135196 A1* | 5/2013 | Park .......................... | G06F 3/01 345/156 |
| 2015/0097938 A1* | 4/2015 | Tsou .................. | G06K 9/00604 348/78 |

* cited by examiner

*Primary Examiner* — Alexander Eisen
*Assistant Examiner* — Abhishek Sarma
(74) *Attorney, Agent, or Firm* — Ference & Associates LLC

(57) ABSTRACT

An embodiment provides a method, including: receiving data relating to a focus of user gaze; associating, using a processor, the focus of user gaze with at least one predetermined area within a document displayed in a display device; and responsive to the associating, automatically updating a document status based on the focus of user gaze. Other aspects are described and claimed.

20 Claims, 3 Drawing Sheets

EYE TRACKING FOR AUTOMATICALLY UPDATING DOCUMENT STATUS

BACKGROUND

An information handling device ("device", "apparatus"), for example, a desktop computing device, a laptop computing device, a tablet computing device, a hybrid laptop/tablet computing device, an e-reader, a kiosk, etc., may be used in connection with message or document handling applications. Users conventionally employ such devices for viewing content, e.g., reading emails, texts, instant messages, etc.

In certain situations it is convenient or necessary to determine if the user has already reviewed or read certain documents, e.g., emails, other messages or document types, etc. In this regard, modern e-mail programs for example often include a feature that automatically marks messages as "read" or "unread" to help users organize and work with their e-mail repositories. Read versus unread e-mails may be distinguished visually, e.g., by different text colors or highlighting. Commonly, applications or programs attempt to determine if a user has read a document by soliciting manual inputs verifying the same.

BRIEF SUMMARY

In summary, one aspect provides a method, comprising: receiving data relating to a focus of user gaze; associating, using a processor, the focus of user gaze with at least one predetermined area within a document displayed in a display device; and responsive to said associating, automatically updating a document status based on the focus of user gaze.

Another aspect provides an apparatus, comprising: a display device; a sensor; a processor operatively coupled to the sensor and the display device; and a memory storing instructions executable by the processor to: receive data relating to a focus of user gaze; associate the focus of user gaze with at least one predetermined area within a document displayed in the display device; and responsive to said association, automatically update a document status based on the focus of user gaze.

A further aspect provides a product, comprising: a storage device having code stored therewith, the code being executable by a processor and comprising: code that receives data relating to a focus of user gaze; code that associates the focus of user gaze with at least one predetermined area within a document displayed in a display device; and code that, responsive to said association, automatically updates a document status based on the focus of user gaze.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
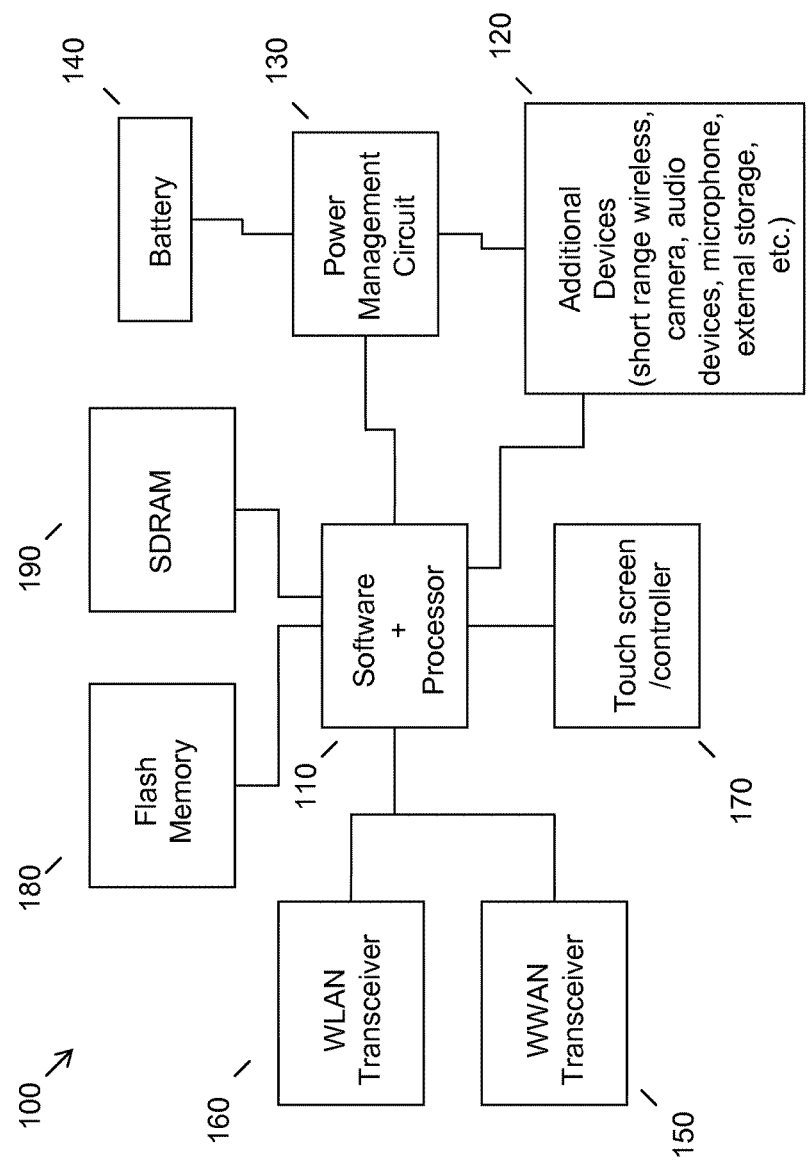
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While some applications have attempted to assist users in marking content with a status, e.g., "read" versus "unread", "accepted" versus "not accepted", etc., and in some cases automated techniques have been applied, such attempts are often inaccurate. For example, in most e-mail programs a message is typically marked as read if it has been highlighted in the preview pane. But just because a message has been highlighted does not necessarily mean that it has been read or even glanced at. A message can become highlighted (and thus automatically marked as read) if the user scrolls through it in the preview pane or if the message is immediately below a message in the inbox that has been deleted. A user might never look at a message's contents but it will still be marked as read.

User devices may employ gaze tracking technology. Gaze tracking technologies provide the ability to determine where a user's focus of gaze is located, e.g., using an image of the user that is analyzed to determine the user's focus relative to a display screen or sub-portion thereof. Such technologies have until now primarily been employed in highly specialized applications, e.g., studies conducted in marketing and the like.

Accordingly, an embodiment uses gaze tracking or eye tracking to determine when a document, e.g., an e-mail message, is to be marked as read. Eye tracking or gaze tracking technology may be employed in such applications to assist in determining that a document such as an email message has indeed been viewed by the user. For example, in an embodiment, an email message will not be marked as read unless the user has fixated on the message contents for some number of seconds, e.g., as determined via use of gaze tracking technology. An embodiment thus provides a much more accurate indicator of whether or not a document such as an e-mail has been read when compared with existing solutions.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip or circuit design found for example in tablet or other mobile computing platforms. Software and processor(s) are combined in a single chip or circuit 110. Processors comprise internal arithmetic units, registers, cache memory, busses, I/O ports, etc., as is well known in the art. Internal busses and the like depend on different vendors, but essentially all the peripheral devices (120) may attach to a single chip or circuit 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) or circuit(s) 130, e.g., a battery management unit, BMU, which manage power as supplied, for example, via a rechargeable battery 140, which may be recharged by a connection to a power source (not shown). In at least one design, a single chip or circuit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 may be included, for example a camera. Commonly, system 100 will include a touch screen 170 for data input and display/rendering. System 100 also typically includes various memory devices, for example flash memory 180 and SDRAM 190.

Figure 2:
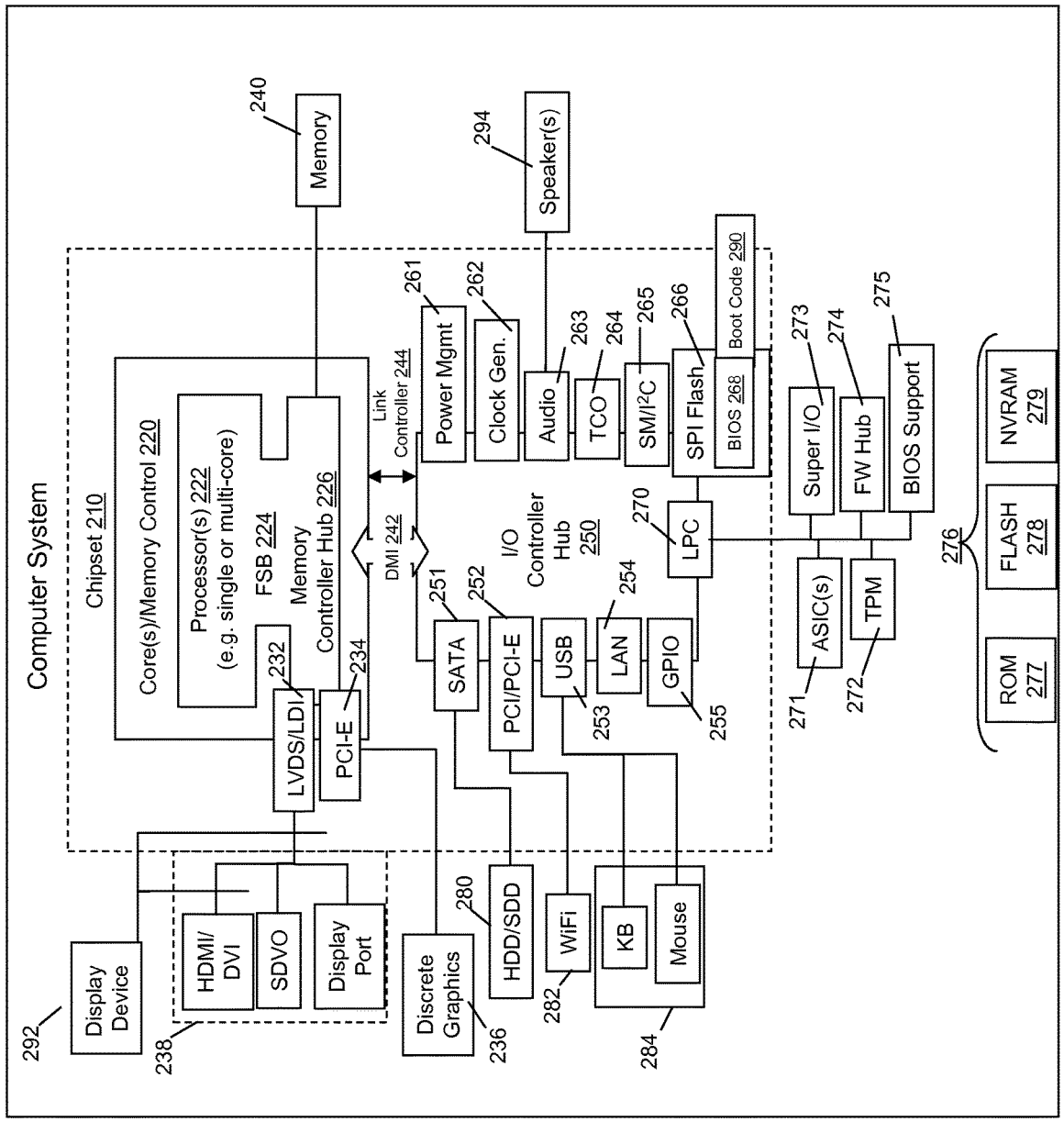
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices that employ gaze tracking technology, e.g., as available from various sources such as Seeing Machines, Limited. For example, Seeing Machines face API technology or like API providing gaze focus information may be used, according to an embodiment, in connection with an email program, a user agreement program (e.g., shrink wrap licensing program), SMS text messaging program, etc. This allows the program to access information relating to the user's focus of gaze relative to a document displayed in connection with one of these programs, e.g., as provided by an appropriate API.

Figure 3:
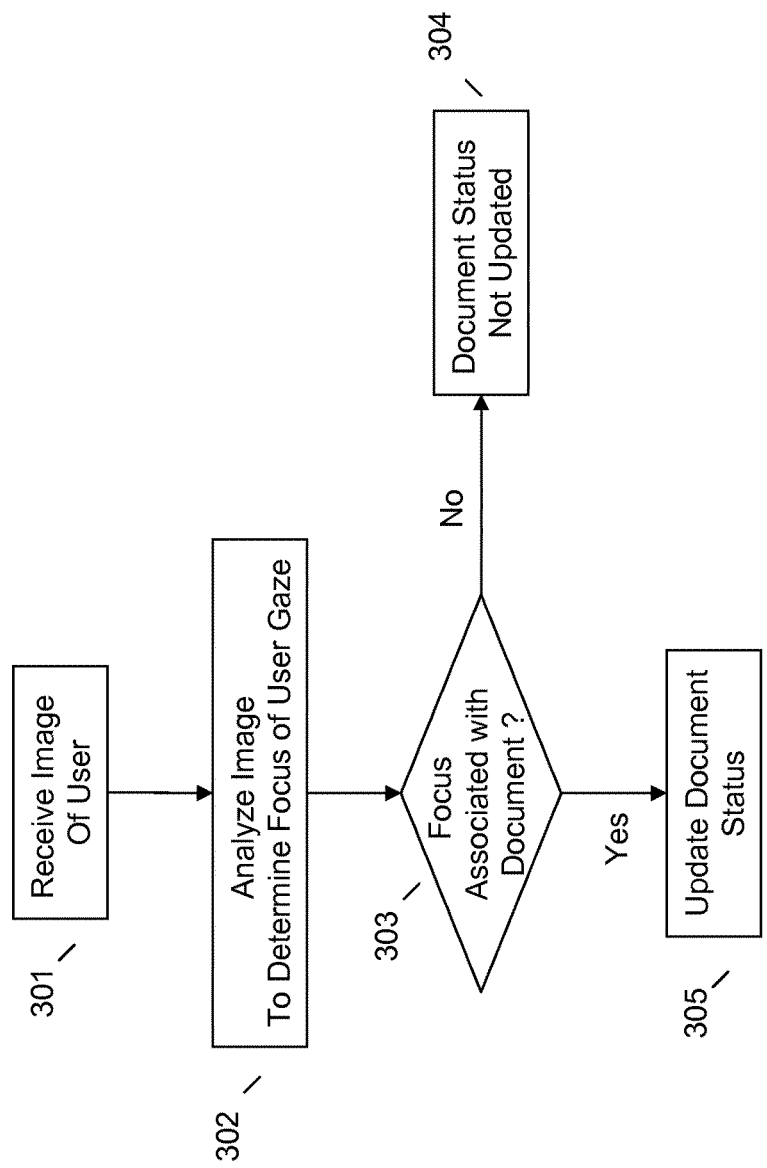
FIG. 3 illustrates an example method of using eye tracking for automatically updating document status.

For example, and referring to FIG. 3, an embodiment may receive, e.g., using an image capture device such as a camera or other image sensor, an image of a user at 301. An embodiment may then determine a focus of user gaze using the image at 302, e.g., using data such as provided by an eye tracking technology API. An embodiment then determines if the focus of user gaze is associated with the document at 303, e.g., determines if the focus of user gaze is associated with at least one predetermined area within a document displayed in a display device. If so, an embodiment may automatically update a document status based on the focus of user gaze being associated with the document, e.g., at a predetermined area at 305. Otherwise, the document's status may not be updated 304.

It will be appreciated that in some embodiments, a predetermined area within the document may be the whole document itself, e.g., an embodiment may associate the focus of user gaze more generally with the document as a whole at 303 by determining the user has looked at least at one part of the document. In other embodiments, a predetermined area within the document may be a specific sub-portion or region within the document, e.g., an embodiment may require that the user actually look at a particular sub-portion or region within the document, as determined at 303, prior to updating the document's status at 305. In still other embodiments, a predetermined area within the document may be a sequence of specific sub-portions or regions within the document, e.g., looking at particular portions of a document in a particular order.

It may also be appreciated that in various embodiments, the document may take a variety of forms and, depending on the particular document, different functionality may be implemented. For example, in the case of an email document or other message type document, a simple association between the focus of user gaze and the document itself (irrespective of which sub-region or portion) may suffice to mark the document as "read". However, for other documents, e.g., a high priority email, a user license agreement, a legal document, etc., more refined user focus may be required prior to updating the documents status at 305.

For example, in the case of a user shrink wrapper license agreement, an embodiment may require that a user's focus of gaze be place within a particular sub-region or portion within the document prior to updating the document's status at 305. Likewise, an embodiment may require that the user's focus of gaze be associated with a document or sub-portion or region for a predetermined time prior to updating the document's status at 305.

In an embodiment, updating a document's status may take a variety of meanings. For example, in an email program, a document's status may be "read" or "unread", whereas for a user agreement, the document's status may be "reviewed" or "not reviewed", "agreed" or "not agreed", etc.

In other embodiments, the program functionality may be altered based on the input of information regarding the user's gaze. For example, an embodiment may determine the focus of user gaze is not associated with the at least one predetermined area within the document for at least the predetermined time at 303, and thereafter provide an indication (e.g., a visual indication) that the focus of user gaze must be associated for at least the predetermined time prior to updating the document status. In this regard, given the particular document in question, the automatic updating of a document status may include activating a user interface option allowing a user to mark the document as read or agreed to, e.g., marking manually an email is read only after looking at the email for a predetermined time, in a predetermined place, etc. Likewise, a user's ability to "accept" an agreement, e.g., via manual click or other input, may be altered depending upon appropriate gaze tracking information being received, e.g., as determined at 303. For example, an option to "accept" may not be enabled prior to receipt of appropriate gaze tracking information.

Thus, an embodiment permits capturing/receiving of an image of a user in order to determine that a focus of user gaze using the image is associated with at least one predetermined area within a document displayed in a display device. Given this information, an embodiment may differentially handle various program functionality, for example, responsive to an appropriate association being determined, automatically updating a document status based on the focus of user gaze.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An apparatus, comprising:
   a display device;
   a sensor;
   a processor operatively coupled to the sensor and the display device; and
   a memory storing instructions executable by the processor to:
   receive data relating to a focus of user gaze;
   associate the focus of user gaze with a document within an application, the application displaying the document in the display device;
   determine that the focus of user gaze is associated with the document within the application for at least a predetermined time prior to automatically updating a status of the document based on the focus of user gaze; and
   responsive to said association, automatically update the status of the document based on the focus of user gaze;
   wherein the instructions that automatically update the status of the document comprise instructions that mark the document as read within the application.

2. The apparatus of claim 1, wherein the document is selected from the group of documents consisting of an email, an SMS text message, an instant message, and an electronically presented user agreement.

3. The apparatus of claim 1, wherein the instructions are executable by the processor to associate the focus of user gaze with at least one additional predetermined area within the application prior to automatically updating a document status based on the focus of user gaze.

4. The apparatus of claim 1, wherein the instructions are executable by the processor to:
   provide an indication that the focus of user gaze must be associated with the at least one predetermined area within the document prior to updating the document status.

5. The apparatus of claim 1, wherein the instructions are executable by the processor to activate a user interface option requesting permission to mark the document as completely read within in the application prior to automatically updating the document status.

6. The apparatus of claim 3, wherein the at least one additional predetermined area comprises a plurality of additional predetermined areas; and
   wherein the focus of user gaze must be associated with the plurality of additional predetermined areas in a particular sequence.

7. A product, comprising:
   a non-signal storage medium having code stored therewith, the code being executable by a processor and comprising:
   code that receives data relating to a focus of user gaze;
   code that associates the focus of user gaze with a document within an application, the application displaying the document displayed in a display device;
   code that determines that the focus of user gaze is associated with the document within the application for at least a predetermined time prior to automatically updating a status of the document based on the focus of user gaze; and
   code that, responsive to said association, automatically updates the status of the document based on the focus of user gaze;
   wherein the code that automatically updates the status of the document comprises code that marks the document as read within the application.

8. The product of claim 7, wherein the document is selected from the group of documents consisting of an email, an SMS text message, an instant message, and an electronically presented user agreement.

9. The product of claim 7, further comprising code that activates a user interface option requesting permission to mark the document as completely read within in the application prior to automatically updating the document status.

10. The product of claim 7, further comprising code that associates the focus of user gaze with at least one additional predetermined area within the application prior to automatically updating a document status based on the focus of user gaze.

11. The product of claim 10, wherein the at least one additional predetermined area comprises a plurality of additional predetermined areas; and
    wherein the focus of user gaze must be associated with the plurality of additional predetermined areas in a particular sequence.

12. A method, comprising:
    receiving data relating to a focus of user gaze;
    associating, using a processor, the focus of user gaze with a document within an application, the application displaying the document in a display device;
    determining that the focus of user gaze is associated with the document within the application for at least a predetermined time prior to automatically updating a status of the document based on the focus of user gaze; and
    responsive to said associating, automatically updating the status of the document based on the focus of user gaze;
    wherein automatically updating the status of the document comprises marking the document as read within the application.

13. The method of claim 12, wherein the document is selected from the group of documents consisting of an email, an SMS text message, an instant message, and an electronically presented user agreement.

14. The method of claim 12, further comprising associating the focus of user gaze with at least one additional predetermined area within the application prior to automatically updating a document status based on the focus of user gaze.

15. The method of claim 12, further comprising:
    providing an indication that the focus of user gaze must be associated with the at least one predetermined area within the document prior to updating the document status.

16. The method of claim 15, wherein the indication is a visual indication.

17. The method of claim 12, further comprising, activating a user interface option requesting permission to mark the document as completely read within in the application prior to automatically updating the document status.

18. The method of claim 14, wherein the at least one additional predetermined area comprises a plurality of additional predetermined areas; and wherein the focus of user gaze must be associated with the plurality of additional predetermined areas in a particular sequence.

19. The method of claim 1, wherein the application comprises a communication application.

20. The method of claim 19, wherein the communication application is selected from the group consisting of: an email application, a text messaging application, and an instant messaging application.

* * * * *